United States Patent
Dajiang

(10) Patent No.: US 7,979,901 B2
(45) Date of Patent: *Jul. 12, 2011

(54) CONTROLLING THE NUMBER OF INTERNET PROTOCOL SECURITY (IPSEC) SECURITY ASSOCIATIONS

(75) Inventor: Zhang Dajiang, Beijing (CN)

(73) Assignee: Nokia Corporation, Espoo (FI)

( * ) Notice: Subject to any disclaimer, the term of this patent is extended or adjusted under 35 U.S.C. 154(b) by 1465 days.

This patent is subject to a terminal disclaimer.

(21) Appl. No.: 11/320,567

(22) Filed: Dec. 30, 2005

(65) Prior Publication Data

US 2007/0157305 A1 Jul. 5, 2007

(51) Int. Cl.
*G06F 15/16* (2006.01)
(52) U.S. Cl. ....................................................... 726/15
(58) Field of Classification Search .................. 380/255, 380/277, 278, 279; 713/150, 151, 152, 153, 713/155, 156, 158, 166, 167
See application file for complete search history.

(56) References Cited

U.S. PATENT DOCUMENTS

| | | | |
|---|---|---|---|
| 7,266,703 B2* | 9/2007 | Anand et al. | 713/189 |
| 7,536,719 B2* | 5/2009 | Swander | 726/14 |
| 2005/0266798 A1* | 12/2005 | Moloney et al. | 455/41.2 |
| 2006/0104252 A1* | 5/2006 | Song et al. | 370/338 |

OTHER PUBLICATIONS

3GPP TSG SA WG3 Security-S3#39, "*Tunnel Management in WLAN Interworking*", Jun. 28-Jul. 1, 2005, pp. 1-3.

* cited by examiner

*Primary Examiner* — Pramila Parthasarathy
(74) *Attorney, Agent, or Firm* — Mintz, Levin, Cohn, Ferris, Glovsky and Popeo, P.C.

(57) ABSTRACT

The invention provides a system and method for controlling the number of Internet Protocol Security (IPsec) security associations per Internet Key Exchange (IKE) security association for a single user. The limit on the number of security association (SA) tunnels per key management protocol SA may be stored in a server. A user equipment sends a request, to the server, to set up a new SA. The server, upon receiving the request, checks whether the limit on the number of SA tunnels per key management protocol has been reached. The request is accepted when the limit has not yet been reached.

17 Claims, 5 Drawing Sheets

CONTROLLING THE NUMBER OF INTERNET PROTOCOL SECURITY (IPSEC) SECURITY ASSOCIATIONS

BACKGROUND OF THE INVENTION

1. Field of the Invention

The invention relates to communications technology, such as wireless communication systems. In particular, the invention relates to a novel method and system for configuring and managing security associations of Internet Protocol Security.

2. Description of the Related Art

A communication system may be seen as a facility that enables communication between two or more entities such as user equipment and/or other nodes or devices associated with the system. The communication may include, for example, the transfer of voice, data, multimedia and other types of information. A communication system may be circuit switched or packet switched. In addition, a communication system may be configured to provide wireless communication. Communication systems able to support mobility of communications devices across a large geographic area are generally called mobile communications system. Furthermore, there are a number of formats available for transmitting data or providing communication between devices.

Internet Protocol (IP) Security, also referred to as IPsec, is a set of protocols which support the secure exchange of packets in a communication system at the network or IP layer. Additionally, IPsec may be considered a framework for providing security in IP networks. The set of security services offered by IPsec may include access control, connectionless integrity, data origin authentication, detection and rejection of replays, confidentiality (via encryption), and limited traffic flow confidentiality.

IPsec has been deployed widely to implement Virtual Private Networks (VPN). VPNs are networks that are constructed by using public wires to connect nodes. For example, there are a number of systems that enable you to create networks using the Internet as the medium for transporting data. These systems use encryption and security mechanisms, such as IPsec, to ensure that only authorized users can access the network and that the data cannot be intercepted.

Therefore, IPsec provides confidentiality and authentication services to IP traffic. These services are provided by protocols called Authentication Header (AH), which allows for authentication of the sender of data, and Encapsulating Security Payload (ESP), which supports both authentication of the sender and encryption of data.

IPsec supports Transport and Tunnel encryption modes. Transport mode encrypts only the data portion (payload) of each packet, but leaves the header untouched. The more secure Tunnel mode encrypts both the header and the payload. On the receiving side, an IPSec-compliant device decrypts each packet.

Authentication Header and Encapsulating Security Payload require session keys in order to operate. The session keys are typically generated by key management protocols, such as Internet Key Exchange (IKE). A key management protocol called Authentication and Key Agreement (AKA) may also be used, especially in communication networks based in $3^{rd}$ Generation Partnership Project (3GPP) systems. Other key management protocols may also be used.

IKE performs mutual authentication between two parties and establishes an IKE security association (SA). The IKE SA includes shared secret information that can be used to efficiently establish SAs for ESP or AH, and a set of cryptographic algorithms to be used by the SAs to protect the traffic that they carry.

As mentioned above, IPsec uses security associations to provide its services. An IPsec security association includes information such as traffic selectors, cryptographic transforms, session keys, and session key lifetimes. A key management application is responsible for negotiating the creation and deletion of an IPsec security association. Generally, IPsec services and key management protocols may be found in, for example, dedicated security gateways, servers, desktop computers, and handheld terminals.

FIG. 1 is a block diagram illustrating an example of how IPsec provides confidentiality and authentication services. Specifically, IPsec provides a boundary between unprotected interfaces and protected interfaces. Traffic which crosses the IPsec boundary 1 is subject to access controls that may be specified by an operator (not shown). The access controls serve to indicate whether packets should be allowed to cross the IPsec boundary 1 unimpeded, whether they are provided with security services by AH/ESP 2, or whether they are discarded 3. A bypass facility 5 may be provided to allow the traffic to traverse the IPsec boundary 1 without cryptographic protection. In addition, an IKE module 4 may be provided as a protected-side key and security management function.

As discussed above, IPsec uses two protocols for providing traffic security services: AH and ESP. The IP AH provides integrity and data origin authentication, with optional anti-replay features. The ESP protocol offers the same set of services, and also offers confidentiality. Both AH and ESP provide access control, enforced through the distribution of cryptographic keys and the management of traffic flows. Each protocol supports a transport mode and a tunnel mode. Transport mode provides protection for next layer protocols. In tunnel mode, AH and ESP are applied to tunneled IP packets. Tunnel refers to an IPsec SA used to protect the communications from the user equipment. (UE) to the network.

IPsec allows the user or operator to control the granularity at which a security service is offered. However, according to prior art solutions, operators can only have course granularity control over the number of IPsec SA tunnels between the UE and the Packet Data Gateway (PDG) for all users. When operators set the maximum value for the number of IPsec SAs per IKE SA at PDG, the value will be effective for all subscribers. Operators cannot distinguish between different subscribers who may subscribe to different classes of services. Therefore, a method and system is required for dynamically establishing the number of IPsec SA tunnels per IKE SA thereby providing fine granularity control to the operators.

SUMMARY OF THE INVENTION

The present invention provides, according to one embodiment, a system for dynamically establishing the maximum number of Internet Protocol Security (IPsec) security associations. The system includes a memory configured to store a limit on a number of security association (SA) tunnels per key management protocol SA, and an interface configured to communicate a request for setting up a new SA to the memory. The memory, upon receiving the request, checks whether the limit on the number of SA tunnels per key management protocol has been reached. The request may be accepted or denied based upon whether the limit on the number of SA tunnels per key management protocol has already been reached. In one example of the invention, a user equipment may send the request and a server, such as a home subscriber server (HSS), may receive the request and store the limit. In addition, according to one embodiment of the invention, the key management protocol may be an Internet Key Exchange (IKE) protocol.

According to another embodiment of the invention, a method for dynamically establishing the maximum number of Internet Protocol Security (Ipsec) security associations is provided. The method includes the steps of storing a limit on a number of security association (SA) tunnels per key management protocol SA in a server, and receiving a request, at the server, from a user equipment (UE) to set up a new SA. The method may further includes the step of checking whether the limit on the number of SA tunnels per key management protocol has been reached. The request is denied when the limit on the number of SA tunnels has bee reached, but accepted when the limit has not yet been reached.

According to another aspect of the invention, a system for dynamically establishing the maximum number of Internet Protocol Security (Ipsec) security associations is provided. The system includes storing means for storing a limit on a number of security association (SA) tunnels per key management protocol SA in a server, receiving means for receiving a request, at the server, from a user equipment (UE) to set up a new SA, checking means for checking whether the limit on the number of SA tunnels per key management protocol has been reached, and accepting means for accepting the request when the limit on the number of SA tunnels has not been reached.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Internet Protocol Security (IPsec), as mentioned above, is a set of protocols which provide confidentiality and authentication services to IP traffic. An IPsec implementation may operate in a host, as a security gateway, or as an independent device, affording protection to IP traffic. A security gateway may an intermediate system implementing IPsec, such as a firewall or router which has been IPsec enabled.

As discussed above, IPsec utilizes Authentication Header (AH) and Encapsulating Security Payload (ESP) protocols in order to provide traffic security services. In addition, IPsec allows the user or operator to control the granularity at which a security service is offered. For instance, a single encrypted tunnel, which is an IPsec security association used in WLAN 3GPP IP access to protect the communications from the WLAN UE to the 3GPP network, may be created to carry all the traffic between two security gateways or a separate encrypted tunnel can be created between each pair of hosts communicating across the gateways. IPsec includes facilities for specifying whether AH or ESP security protocol is employed and which security services and cryptographic algorithms are to be used, in addition to specifying the granularity at which protection should be applied.

The AH and ESP protocols utilize security associations (SAs). Additionally, an important function of IKE is the establishment and maintenance of these security associations. A security association is a simplex connection that provides security services to the traffic carried by it. Security services are provided to the SA by the use of AH or ESP.

Traditionally, users or operators were only provided with coarse granularity control over the number of IPsec SA tunnels between the UE and Packet Data Gateway (PDG) for all users. Operators are only able to configure the maximum value for the number of IPsec security associations per IKE security association at the Packet Data Gateway (PDG). Once this maximum value is set, it will be effective for all subscribers. Therefore, operators may not be able to distinguish between different subscribers who may subscribe to different classes of services. The present invention, however, provides operators with fine granularity control over the number of IPsec security association tunnels per IKE security association between the user equipment (UE) and PDG of users, which may be related to the Quality of Service (QoS) offered to each user. For example, for a subscriber who has subscribed to a lower class of service, the operator can limit the number of IPsec security associations per IKE security association between the UE and PDG to only 1.

Figure 1:
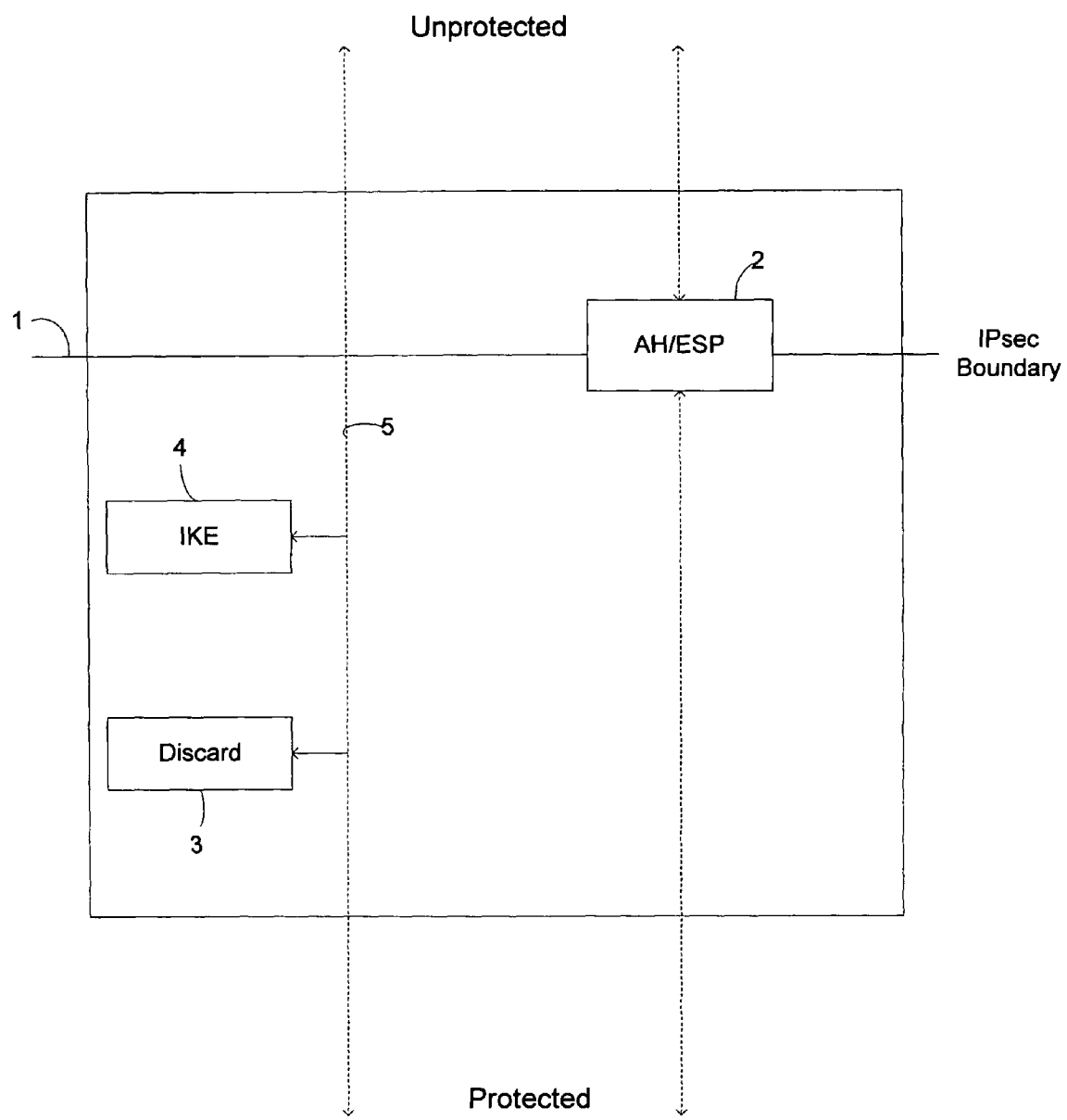
FIG. 1 illustrates a block diagram according to one embodiment of the invention.
Figure 2:
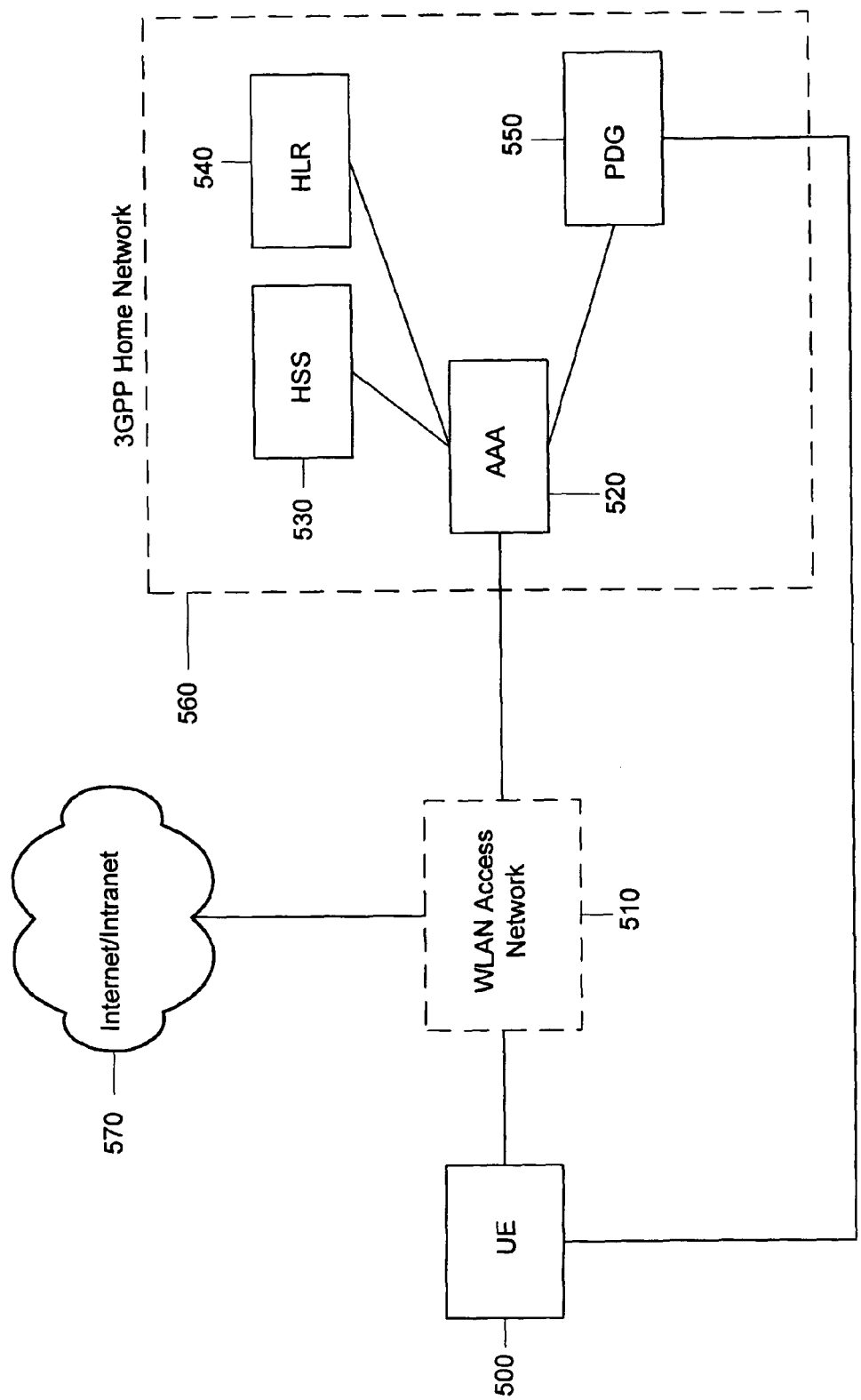
FIG. 2 illustrates a system according to an embodiment of the invention.

FIG. 2 illustrates a system according to one embodiment of the present invention. The system includes a UE 500, which may be equipped with a Universal Integrated Circuit Card (UICC) or a subscriber identity module (SIM) card, for accessing the WLAN interworking service 510. The UE 500 may be capable of WLAN access only, or may be capable of both WLAN and 3GPP System access. The UE may be any mobile terminal or device. Additionally, the UE may be a laptop computer or PDA with a WLAN card (UICC or SIM), card reader and software applications. The UE 500 is connected via an interface to the PDG 550 in order to provide a UE-initiated tunnel between the UE 500 and the PDG 550. The UE 500 and PDG 550 run IKE protocol to establish an IPsec tunnel and protect user data packets that are transmitted.

The WLAN Access Network 510 is connected to the 3GPP Network 560 via an interface for transporting authentication, keying and authorization information. The 3GPP Network 560 may include an Authentication Authorization Accounting (AAA) server 520, HSS 530, Home Location Register (HLR) 540, and PDG 550. The AAA server 520 may be utilized to retrieve authentication information from the HSS/HLR 530, 540 of the subscriber's home network. In addition, the AAA server 520 may authenticate the subscriber based on the authentication information retrieved from the HSS/HLR 530, 540 and communicate the authorization information to the WLAN Access Network 510. The AAA server 520 also may retrieve tunneling attributes and the UE's IP configuration parameters from the PDG 550.

In one aspect of the present invention, the HSS/HLR 530, 540 stores a limit on the number of IPsec SA tunnels per IKE SA for each subscriber in their respective profile. The UE 500 may then request that a new SA be set up. The HSS/HLR 530, 540 checks whether the stored limit on the number of IPsec SA tunnels per IKE SA has been reached. If the limit has not been reached, the UE 500 request will be granted. If, however, the limit has been reached, then the UE 500 request will be denied.

Figure 5:
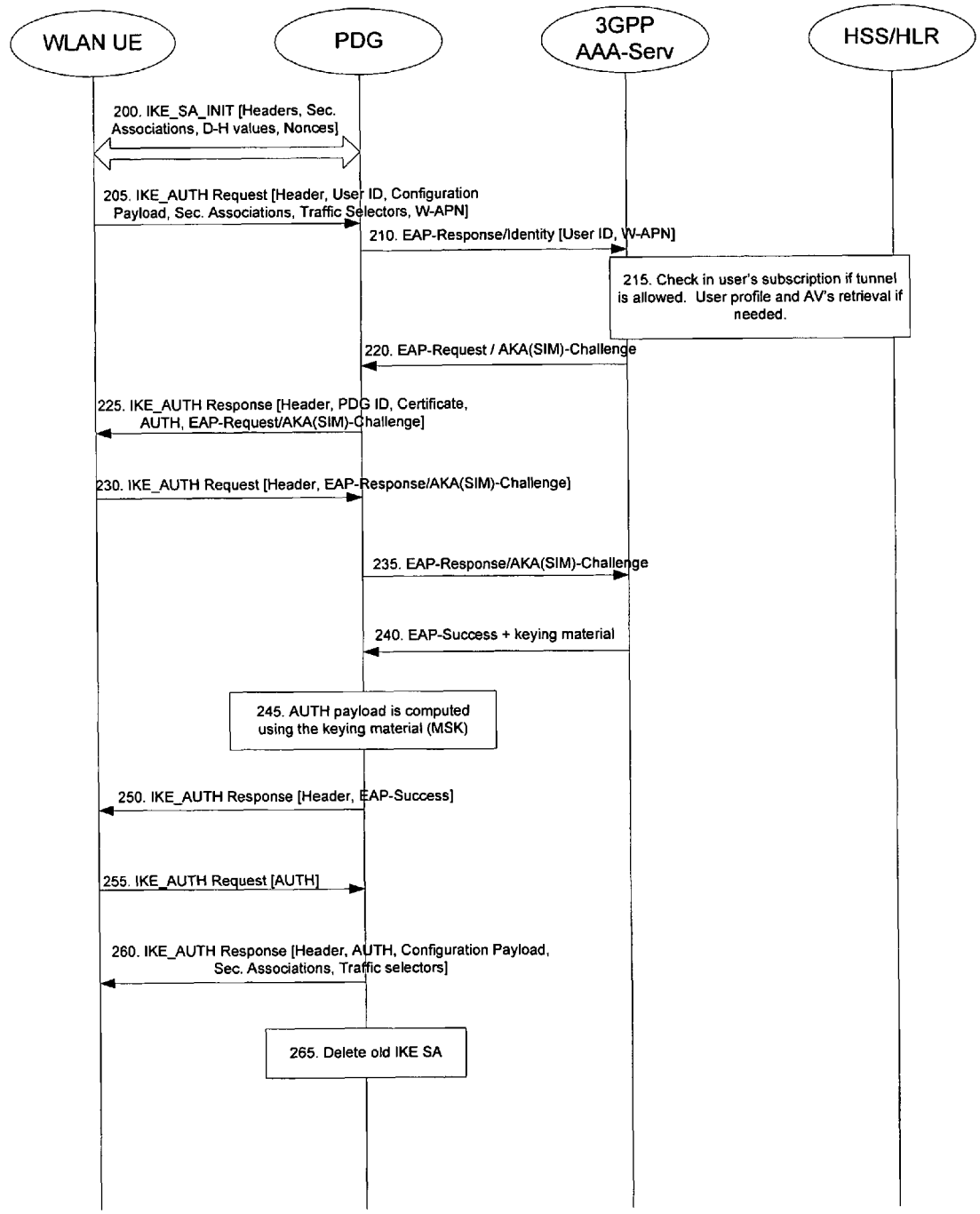
FIG. 5 illustrates a method according to an embodiment of the invention.

According to another embodiment of the invention, a method for setting up an IKE SA is provided as illustrated in FIG. 5. First, the UE and PDG exchange a first pair of messages IKE_SA_INIT, in which the PDG and UE negotiate cryptographic algorithms, exchange nonces, and perform a Diffie_Hellman exchange 200. The PDG is the tunnel end point in the network. Next, at step 205, the UE sends the user identity and the WLAN Access Point Name (W-APN) information in the first message of the IKE_AUTH request and begins negotiation of child security associations. The UE sends the configuration payload within the IKE_AUTH request to obtain a Remote IP Address.

The PDG sends the Access Request message with an empty EAP AVP to the AAA server, including the user identity and W-APN 210. The PDG may include a parameter indicating that the authentication is being performed for tunnel establishment. In step 215, the AAA server retrieves the user profile and authentication vectors from HSS/HLR and determines the EAP method (SIM or AKA) to be used according to the user subscription and/or the indication received from the UE. The AAA server checks in the user's subscription to determine if the user is authorized to establish the tunnel.

In step 220, the AAA server initiates the authentication challenge. The PDG responds with its identity, a certificate, and sends the AUTH parameter to protect the previous message it sent to the UE in the IKE_SA_INIT exchange 225. In step 230, the UE checks the authentication parameters and responds to the authentication challenge. The PDG forwards the EAP-Response/AKA-Challenge message or EAP-Response/SIM-Challenge message to the AAA server 235. When all checks are successful, the AAA server sends an EAP success and the key material to the PDG 240. The key material may include the MSK generated during the authentication process. If the maximum number of IKE SAs for that W-APN is exceeded, the AAA server sends an indication to the PDG that established the oldest active IKE SA to delete the oldest established IKE SA. The AAA server updates the information of IKE SAs active for the W-APN accordingly.

In step 245, the MSK may be used by the PDG to generate the AUTH parameters in order to authenticate the IKE_SA_INIT phase messages. These two first messages had not been authenticated before because the keying material was not yet available. The EAP Success message is forwarded to the UE over IKE in step 250. The UE takes its own copy of the MSK as input to generate the AUTH parameter to authenticate the first IKE_SA_INIT message. The AUTH parameter is sent to the PDG in step 255. The PDG checks whether the AUTH received from the UE is correct and calculates the AUTH parameter which authenticates the second IKE_SA_INIT message. The AUTH parameter is sent to the UE along with the configuration payload, security associations, and IKE parameters 260 and the IKE negotiation terminates. If the PDG detects that the old IKE SA for the W-APN already exists, it will delete the IKE SA and send an informational exchange to the UE with a delete payload instruction so that the old IKE SA is deleted in the UE 265.

Figure 3:
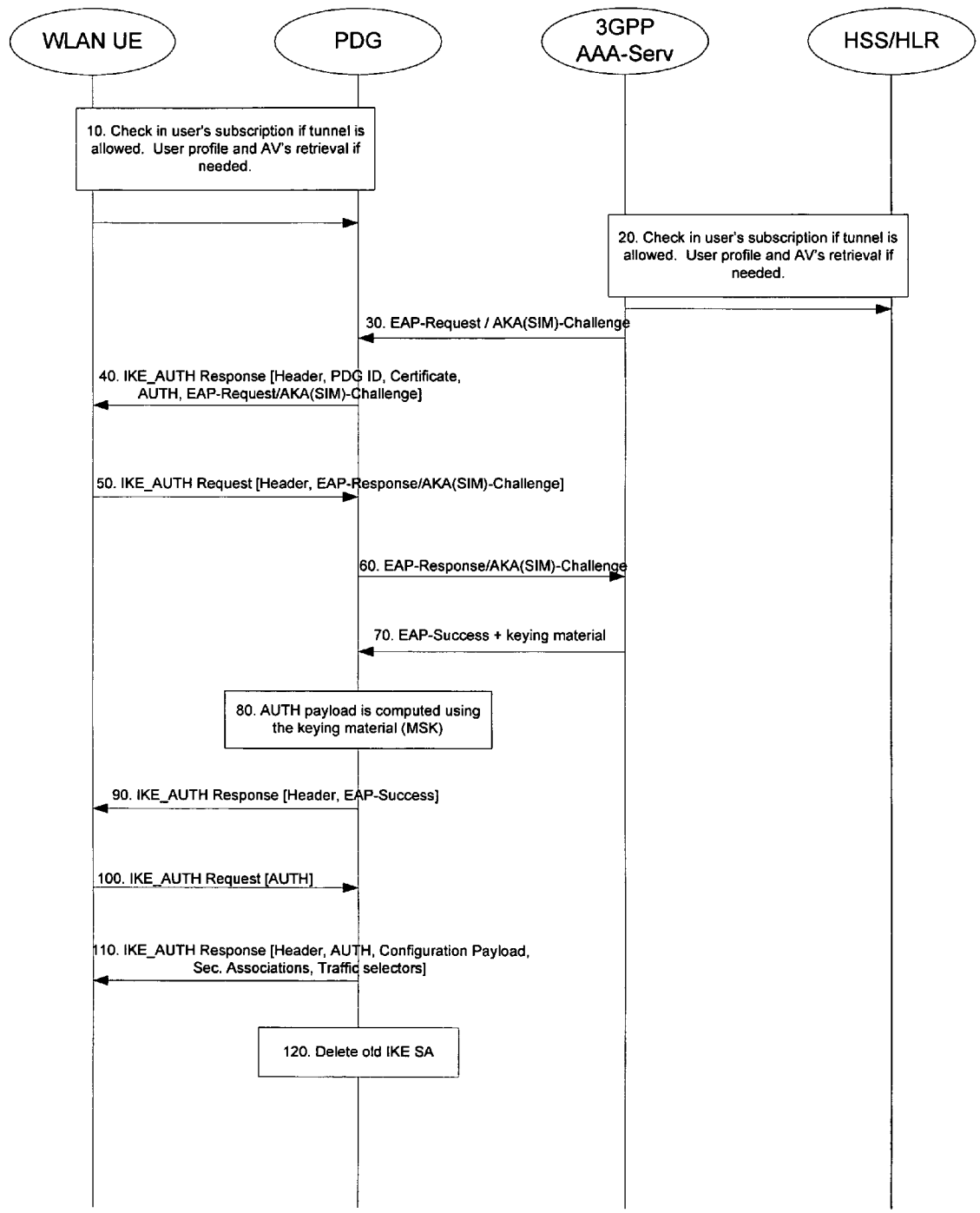
FIG. 3 illustrates a method according to another embodiment of the invention.

FIG. 3 illustrates a method for setting up a new IPsec SA and checking whether the limitation on the number of IPsec SA tunnels per IKE SA has been reached, according to one embodiment of the invention. The user's subscription is first checked to determine if they are authorized to establish a tunnel 10. The user profile and maximum number of IPsec SAs allowed is retrieved from the HSS/HLR 20. In step 30, the AAA server initiates the authentication challenge. The PDG responds with its identity and a certificate 40. The EAP message, received from the AAA server, is included in order to start the EAP procedure over IKE. In step 50, the UE checks the authentication parameters and responds to the authentication challenge. The PDG forwards the EAP-Response/AKA-Challenge message or EAP-Response/SIM-Challenge message to the AAA server 60. When all checks are successful, the AAA server sends an EAP success message and the key material to the PDG 70. According to an aspect of the invention, the EAP success message may be used to deliver the maximum number of IPsec SA tunnels from the AAA server to the PDG. Additionally, in one example of the present invention, the maximum number of IPsec SA tunnels is stored at the HSS/HLR.

In step 80, the MSK may be used by the PDG to generate the AUTH parameters in order to authenticate the IKE_SA_INIT phase messages. The EAP Success message is forwarded to the UE over IKE in step 90. The UE takes its own copy of the MSK as input to generate the AUTH parameter to authenticate the first IKE_SA_INIT message. The AUTH parameter is sent to the PDG in step 100. The PDG checks whether the AUTH received from the UE is correct and calculates the AUTH parameter which authenticates the second IKE_SA_INIT message. The AUTH parameter is sent to the UE along with the configuration payload, security associations, and IKE parameters 110. The PDG deletes the IKE SA and send an informational exchange to the UE with a delete payload instruction when the PDG detects that the old IKE SA already exists 120.

Figure 4:
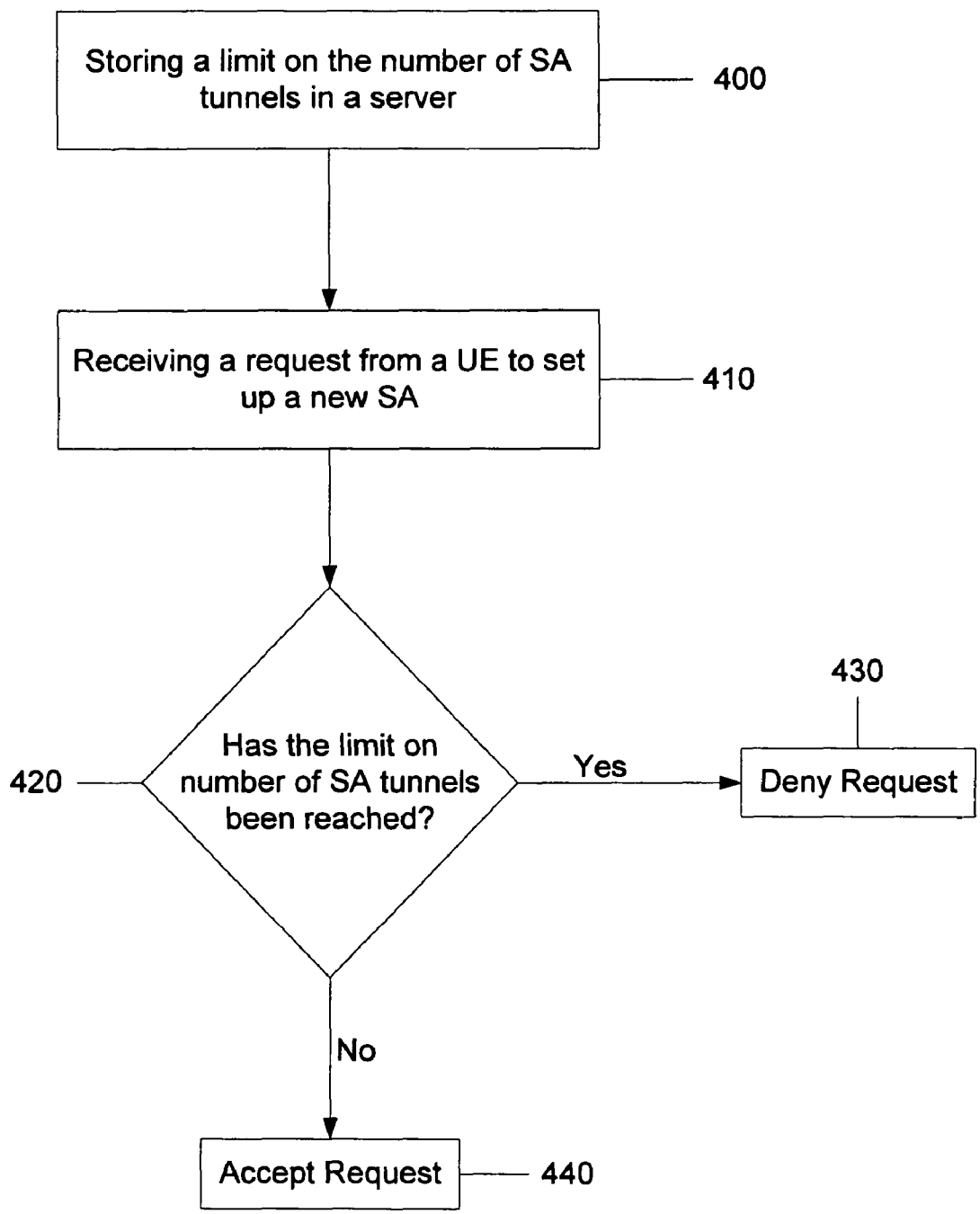
FIG. 4 illustrates flow chart according to one embodiment of the invention.

FIG. 4 is a flow chart illustrating a method according to an embodiment of the invention. The method includes the steps of storing a limit on the number of IPsec SA tunnels per IKE SA for each subscriber in his/her profile in a server 400. The server may be an HSS or HLR server, for example. Next, the server receives a request from a UE to set up a new SA 410. The server checks whether the limit on the number of IPsec SA tunnels per IKE SA has been reached 420. If the limit has not been reached, the request will be accepted 440. If, however, the limit has been reached, then the request will be denied 430.

The above-described method provides fine granularity control over the number of IPsec SA tunnels for a single subscriber. Operators will not need to manually configure the maximum value for the number of IPsec SAs per IKE SA at the PDG. The HSS/HLR stores the information regarding the maximum number of IPsec SA tunnels per IKE SA for each subscriber in their profile. The information may be sent to the PDG when the authentication for a UE is successful. In this manner, the PDG can control the number of IPsec SAs per IKE SA for each subscriber and thereby control the simultaneous sessions. As a result, manual configuration by the operator is no longer necessary.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A method comprising:
   storing, at a server, a limit on a number of security association tunnels per key management protocol security association;
   receiving a request, at the server, from a user equipment to set up a new security association;
   checking whether the limit on the number of security association tunnels per key management protocol has been reached; and accepting the request when the limit on the number of security association tunnels has not been reached.

2. The method of claim 1, further comprising:
wherein the server is implemented by at least one processor.

3. The method of claim 1, further comprising:
denying the request when the limit on the number of security association tunnels has been reached.

4. The method of claim 1,
wherein the server comprises an authentication, authorization, and accounting server, and wherein the authentication, authorization, and accounting server authenticates a subscriber based on authentication information retrieved from at least one of a home subscriber server and a home location register.

5. The method of claim 1, wherein the receiving further comprises receiving the request from the user equipment to set up the new security association under an existing key management protocol security association.

6. The method of claim 1, wherein the storing further comprises storing the limit on the number of security association tunnels in a home subscriber server.

7. The method of claim 1, further comprising:
deleting a prior security association for a network, when a quantity of security associations is reached.

8. An apparatus comprising:
a memory configured to store a limit on a number of security association tunnels per key management protocol security association; and
a processor configured to
receive a request from a user equipment to set up a new security association;
check whether the limit on the number of security association tunnels per key management protocol has been reached; and
accept the request when the limit on the number of security association tunnels has not been reached.

9. The apparatus of claim 8, wherein the request is denied when the limit has been reached.

10. The apparatus of claim 8, wherein the request is sent by a user equipment.

11. The apparatus of claim 8, wherein the new security association is set up under an existing key management protocol security association.

12. The apparatus of claim 8, wherein the key management protocol comprises an internet key exchange protocol.

13. The apparatus of claim 8, wherein the memory is included in a home subscriber server.

14. A system comprising:
storing means, at a server, for storing a limit on a number of security association tunnels per key management protocol security association;
receiving means for receiving a request, at the server, from a user equipment to set up a new security association;
checking means for checking whether the limit on the number of security association tunnels per key management protocol has been reached; and
accepting means for accepting the request when the limit on the number of security association tunnels has not been reached.

15. The system of claim 14, wherein the receiving means comprises means for receiving the request from the user equipment to set up the new security association under an existing key management protocol security association.

16. The system of claim 14, wherein the storing means comprises means for storing, at the server, the limit on the number of security association tunnels per internet key exchange security association.

17. The system of claim 14, wherein the storing means comprises means for storing the limit on the number of security association tunnels in a home subscriber server.

* * * * *